(12) United States Patent
Cameron et al.

(10) Patent No.: US 8,666,241 B2
(45) Date of Patent: *Mar. 4, 2014

(54) STEREO CAMERA WITH AUTOMATIC CONTROL OF INTEROCULAR DISTANCE BASED ON LENS SETTINGS

(71) Applicants: James Cameron, Malibu, CA (US); Vincent Pace, Shadow Hills, CA (US); Patrick Campbell, Stevenson Ranch, CA (US); Ronnie Allum, Sydney (AU)

(72) Inventors: James Cameron, Malibu, CA (US); Vincent Pace, Shadow Hills, CA (US); Patrick Campbell, Stevenson Ranch, CA (US); Ronnie Allum, Sydney (AU)

(73) Assignees: Vincent Pace, Burbank, CA (US); James Cameron, Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,881

(22) Filed: Mar. 26, 2013

(65) Prior Publication Data

US 2013/0208095 A1 Aug. 15, 2013

Related U.S. Application Data

(63) Continuation of application No. 12/409,316, filed on Mar. 23, 2009, now Pat. No. 8,406,619.

(51) Int. Cl.
*G03B 35/00* (2006.01)
*G03B 41/00* (2006.01)
*G03B 3/00* (2006.01)
*G03B 13/00* (2006.01)
*H04N 13/02* (2006.01)
*H04N 5/232* (2006.01)

(52) U.S. Cl.
USPC ............ 396/325; 396/89; 396/333; 348/47; 348/345

(58) Field of Classification Search
USPC .................. 396/89, 322, 324, 325, 331, 333; 348/42, 47, 345
See application file for complete search history.

(56) References Cited

U.S. PATENT DOCUMENTS 3,990,087 A 11/1976 Marks
4,557,570 A 12/1985 Hines
(Continued)

FOREIGN PATENT DOCUMENTS

DE 202005006620 7/2005
WO 94/10604 5/1994

OTHER PUBLICATIONS

21st Century3d.com, 21st Century 3D Introduces Uncompressed 4:4:4 Stereoscopic Camera System—3DVX3, SPIE Stereoscopic Displays and Applications Conference, Jan. 18, 2006; avail. Http://www.21stcentury3d.com/press/pr-060117-3dvx3.html; printed Sep. 11, 2008, 3pp.

(Continued)

*Primary Examiner* — Rochelle-Ann J Blackman
(74) *Attorney, Agent, or Firm* — SoCal IP Law Group LLP; Steven C. Sereboff; John E. Gunther (57) ABSTRACT

A stereographic camera system and method of operating a stereographic camera system are disclosed. The stereographic camera system may include a left camera and a right camera including respective lenses having a focal length and a focus distance, an interocular distance mechanism to set an intraocular distance between the left and right cameras, and a controller. The controller may receive inputs indicating the focal length and the focus distance of the lenses. The controller may control the intraocular distance mechanism, based on the focal length and focus distance of the lenses and one or both of a distance to a nearest foreground object and a distance to a furthest background object, to automatically set the interocular distance such that a maximum disparity of a stereographic image captured by the left and right cameras does not exceed a predetermined maximum disparity.

10 Claims, 7 Drawing Sheets

(56) References Cited

U.S. PATENT DOCUMENTS

| | | |
|---|---|---|
| 4,650,305 A | 3/1987 | Hines |
| 4,725,863 A | 2/1988 | Dumbreck et al. |
| 4,751,570 A | 6/1988 | Robinson |
| 4,881,122 A | 11/1989 | Murakami |
| 4,999,713 A | 3/1991 | Ueno et al. |
| 5,140,415 A | 8/1992 | Choquet |
| 5,175,616 A | 12/1992 | Milgram |
| 5,532,777 A | 7/1996 | Zanen |
| 5,699,108 A | 12/1997 | Katayama et al. |
| 5,727,239 A | 3/1998 | Hankawa et al. |
| 5,740,337 A | 4/1998 | Okino et al. |
| 5,801,760 A | 9/1998 | Uomori |
| 5,864,360 A | 1/1999 | Okauchi et al. |
| 5,978,015 A | 11/1999 | Ishibashi et al. |
| 6,292,634 B1 | 9/2001 | Inaba |
| 6,388,666 B1 | 5/2002 | Murray |
| 6,414,709 B1 | 7/2002 | Palm et al. |
| 6,466,746 B2 | 10/2002 | Inaba |
| 6,512,892 B1 | 1/2003 | Montgomery et al. |
| 6,701,081 B1 | 3/2004 | Dwyer et al. |
| 6,798,406 B1 | 9/2004 | Jones et al. |
| 7,190,389 B1 | 3/2007 | Abe et al. |
| 7,899,321 B2 * | 3/2011 | Cameron et al. ............... 396/325 |
| 8,406,619 B2 * | 3/2013 | Cameron et al. ............... 396/325 |
| 2005/0041095 A1 | 2/2005 | Butler-Smith et al. |
| 2005/0190180 A1 | 9/2005 | Jin et al. |
| 2006/0204240 A1 | 9/2006 | Cameron et al. |
| 2007/0140682 A1 | 6/2007 | Butler-Smith et al. |
| 2007/0146478 A1 | 6/2007 | Butler-Smith et al. |

OTHER PUBLICATIONS

FullCamera.com, 21st Century 3D Introduces New Digital Steroscopic Motion Picture Camera System, avail. http://fullcamera.com/article/cfm/id/281457, Apr. 14, 2008, printed Sep. 11, 2008, 2pp.

Hurwitz, Matt, Dreaming in 3D, Jun. 3, 2005, CineGear Expo News, The Official CineGear Expo Show Newspaper, Jun. 3-5, 2005, pp. 18-19.

World Intellectual Property Organization, International Search Report and Written Opinion for International Application No. PCT/US/2010/026927, mail date May 11, 2010.

Lenny Lipton, Foundations of the Stereoscopic Cinema a Study in Depth, published Jan. 1, 1982, Van Nostrand Reinhold Company, Inc., pp. V.200.1, 102-103, 190, 194-195, 197-202 and 216-218.

European Patent Office, Supplementary European Search Report and Written Opinion for European Application No. 10756576.4, Mail Date Dec. 12, 2011; pp. 1-9.

* cited by examiner

STEREO CAMERA WITH AUTOMATIC CONTROL OF INTEROCULAR DISTANCE BASED ON LENS SETTINGS

RELATED APPLICATION INFORMATION

This patent is a continuation of patent application Ser. No. 12/409,316, filed Mar. 23, 2009, titled STEREO CAMERA WITH AUTOMATIC CONTROL OF INTEROCULAR DISTANCE, now U.S. Pat. No. 8,406,619.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to stereoscopy.

2. Description of the Related Art

Humans view the environment three-dimensionally using binocular vision. Binocular vision is both a visual system and an analytical system. Our brain perceives both distance and speed based, in part, on triangulating visual light information received by the retinas of our respective laterally separated, forward facing eyes. Since both eyes are forward facing, the fields of view of each of our eyes overlap, with each eye perceiving a slightly different perspective of the same area. As we focus on objects closer to our eyes, our eyes rotate towards each other. As we focus on objects afar, our eyes rotate towards a parallel view. The angle between the lines of sight of each eye is commonly termed the convergence angle. The convergence angle is higher when we view objects closer to our eyes and lower when viewing distance object. The convergence angle may be essentially zero, indicating essentially parallel lines of sight, when we view objects at great distance.

Three dimensional imaging, also known as stereographic imaging, dates at least as far back as 1838. Historically, stereographic cameras commonly include two lenses spaced laterally apart a similar distance as an average human's eyes, approximately 65 mm. The effective distance of the lenses from each other is known as the interocular distance. The interocular distance has a strong effect on the apparent depth of a stereographic image. Increasing the interocular spacing increases the apparent depth of a stereographic image. Decreasing the interocular spacing has the effect of decreasing the apparent depth of a stereographic image.

The presentation of stereoscopic images is commonly achieved by providing a first image to be seen only by the left eye and a second image to be seen only by the right eye. Differences, or disparity, between the two images may provide an illusion of depth. Two images having disparity may be perceived as three-dimensional. Two images, or portions of two images, exhibiting excessive disparity may not be perceived as three-dimensional, but may simply be seen as two overlapping two-dimensional images. The amount of disparity that a viewer can accommodate, commonly called the disparity limit, varies among viewers. The disparity limit is also known to vary with image content, such as the size of an object, the proximity of objects within an image, the color of objects, and the rate of motion of objects within the image. The disparity limit, expressed as the angle between the lines of sight of the viewer's eyes, may be about 12-15 minutes of arc for typical stereoscopic images.

A variety of techniques, including polarization, filters, glasses, projectors, and shutters have been used to restrict each eye to viewing only the appropriate image.

One approach to displaying stereographic images is to form the left-eye image on a viewing screen using light having a first polarization state and to form the right-eye image on the same viewing screen using light having a second polarization state orthogonal to the first polarization state. The images may then be viewed using glasses with polarizing lenses such that the left eye only receives light of the first polarization state and the right eye only receives light of a second polarization state. Stereoscopic displays of this type typically project the two polarized images onto a common projection screen. This technique has been used to present 3-D movies.

A second approach to displaying stereographic images is to form the left-eye and right-eye images alternately on a common viewing screen at a high rate. The images may then be viewed using shutter glasses that alternately occult either the right or left eye in synchronism with the alternating images.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits. Elements that have similar functions for either the left or right eyes are assigned the same reference designator with a suffix of either "L" or "R" to indicate left-eye or right-eye, respectively.

DETAILED DESCRIPTION

Description of Apparatus

Figure 1:
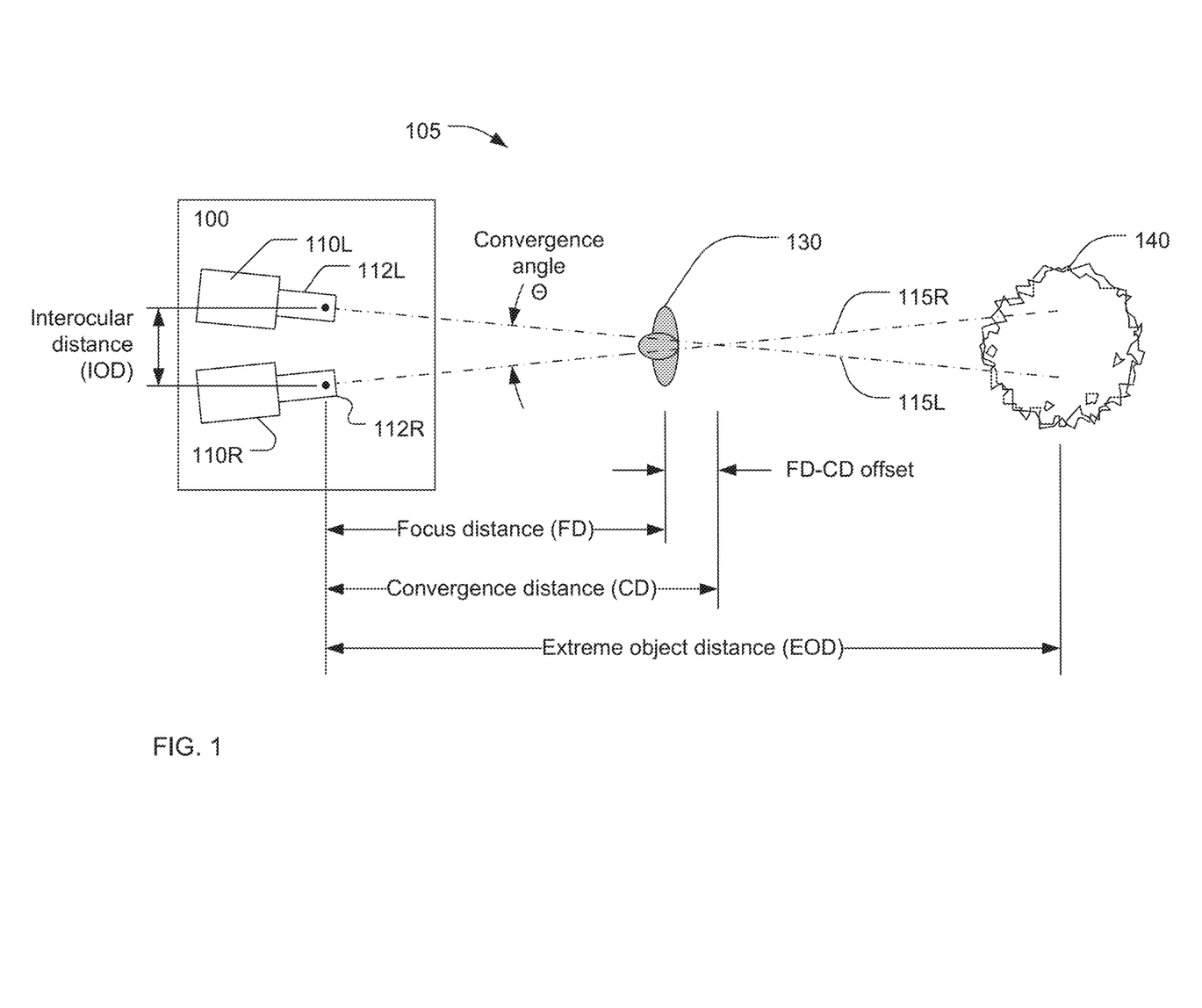
FIG. 1 is a schematic drawing of a stereographic camera in an environment.

Referring now to FIG. 1, a stereographic camera 100 may include a left camera 110L and a right camera 110R. The term "camera" is intended to include any device having an optical system to form an image of an object and a medium to receive and detect and/or record the image. The left and right cameras may be film or digital still image cameras, may be film or digital motion picture cameras, or may be video cameras. The left and right cameras 110L, 110R may be separated by an interocular distance IOD. Each of the left and right cameras 110L, 110R may include a lens 112L, 112R. The term "lens" is intended to include any image-forming optical system and is not limited to combinations of transparent refractive optical elements. A lens may use refractive, diffractive, and/or reflective optical elements and combinations thereof. Each lens may have an axis 115L, 115R that defines the center of the field of view of each camera 110L, 110R.

The cameras 110L, 110R may be disposed such that the axis 115L, 115R are parallel or such that a convergence angle Θ is formed between the two axis 115L, 115R. The cameras 110L, 110R may be disposed such that the axis 115L, 115R cross at a convergence distance CD from the cameras. The interocular distance IOD, the convergence distance CD, and the convergence angle Θ are related by the formula $$\Theta = 2 \text{ ATAN}(IOD/2CD), \text{ or} \quad (1)$$

$$CD = IOD/[2 \text{ TAN}(\Theta/2)]. \quad (2)$$

The interocular distance IOD and the convergence distance CD may be measured from a nodal point, which may be the center of an entrance pupil, within each of the lenses 112L, 112R. Since the entrance pupils may be positioned close to the front of the lenses 112L, 112R, the interocular distance IOD and the convergence distance CD may be conveniently measured from the front of the lenses 112L, 112R.

The stereographic camera 100 may be used to form a stereographic image of a scene 105. As shown in the simplified example of FIG. 1, the scene 105 may include a primary subject 130, which is shown, for example, as a person. The scene 105 may also include other features and objects in the background (behind the primary subject). The distance from the cameras 110L, 110R to the furthest background object 140 which is shown, for example, as a tree, may be termed the extreme object distance EOD.

When the images from a stereographic camera, such as the stereographic camera 100, are displayed on a viewing screen, scene objects at the convergence distance will appear to be in the plane of the viewing screen. Scene objects, such as the primary subject 130 in the example of FIG. 1, located closer to the stereographic camera may appear to be in front of the viewing screen. Scene objects, such as the tree 140 located further from the stereographic camera may appear to be behind the viewing screen.

Each lens 115L, 115R may have adjustable focus. The stereographic camera may have a focus adjusting mechanism to synchronously adjust the focus of the two lenses such that both lenses 115L, 115R may be focused at a common adjustable focus distance FD. The focus adjusting mechanism may couple the focus of the two lenses 115L, 115R mechanically, electrically, electromechanically, electronically, or by another coupling mechanism. The focus distance FD may be adjusted manually, or may be automatically adjusted. The focus distance FD may be adjusted such that the cameras 110L, 110R are focused on the primary subject 130. The focus distance may be automatically adjusted in response to a sensor (not shown) that determines the distance from the cameras 110L, 110R to the primary subject 130. The sensor to determine the distance from the cameras to the primary subject may be an acoustic range finder, an optical or laser range finder, or some other distance measuring device. In the case where the cameras 110L, 110R are digital still image, motion picture, or video cameras, the focus distance may be adjusted in response to one or more processors (not shown) that analyze one or both of the images sensed by the cameras. The processors may be located within or may be coupled to the cameras.

The convergence distance CD and the focus distance FD may commonly be set to the same distance, which may be the distance from the cameras 110L, 110R to the primary subject 130. However, as shown in FIG. 1, the convergence distance CD and the focus distance FD may not be the same distance. For example, the focus distance FD may be set at the distance from the cameras to the primary subject and the convergence distance CD may be set slightly longer than the focus distance. In this case, when the images are displayed, the primary subject will be seen to be in front of the plane of the viewing screen. The difference between the focus distance FD and the convergence distance CD may be an adjustable or predetermined offset. The offset may be absolute, in which case the convergence distance may be calculated by the formula $$CD = FD + \alpha \quad (3)$$

where a is the offset as an absolute dimension. The offset may be relative, in which case the convergence distance may be calculated by the formula $$CD = (FD)(1+\beta) \quad (4)$$

where β is the offset as a portion of FD. For example, an absolute offset α may be a distance measurement such as one foot or two meters, and a relative offset β may be an expression of a relationship or ratio, such as 5% or 10%. Both the absolute offset and the relative offset may be zero, in which case CD=FD.

Each lens 115L, 115R may also have zoom capability, which is to say that the focal length FL of each lens may be adjusted. The stereographic camera 100 may have a focal length adjusting mechanism to synchronously adjust the focal length of the two lenses such that both lenses 115L, 115R may always have precisely the same focal length. The focal length adjustment of the two lenses 115L, 115R may be coupled mechanically, electrically, electronically, electromechanically, or by another coupling mechanism. Commonly, the focal length of the lenses 115L, 115R may be adjusted manually. The focal length of the two lenses 115R, 115L may also be adjusted automatically in accordance with a predetermined scenario.

Figure 2:
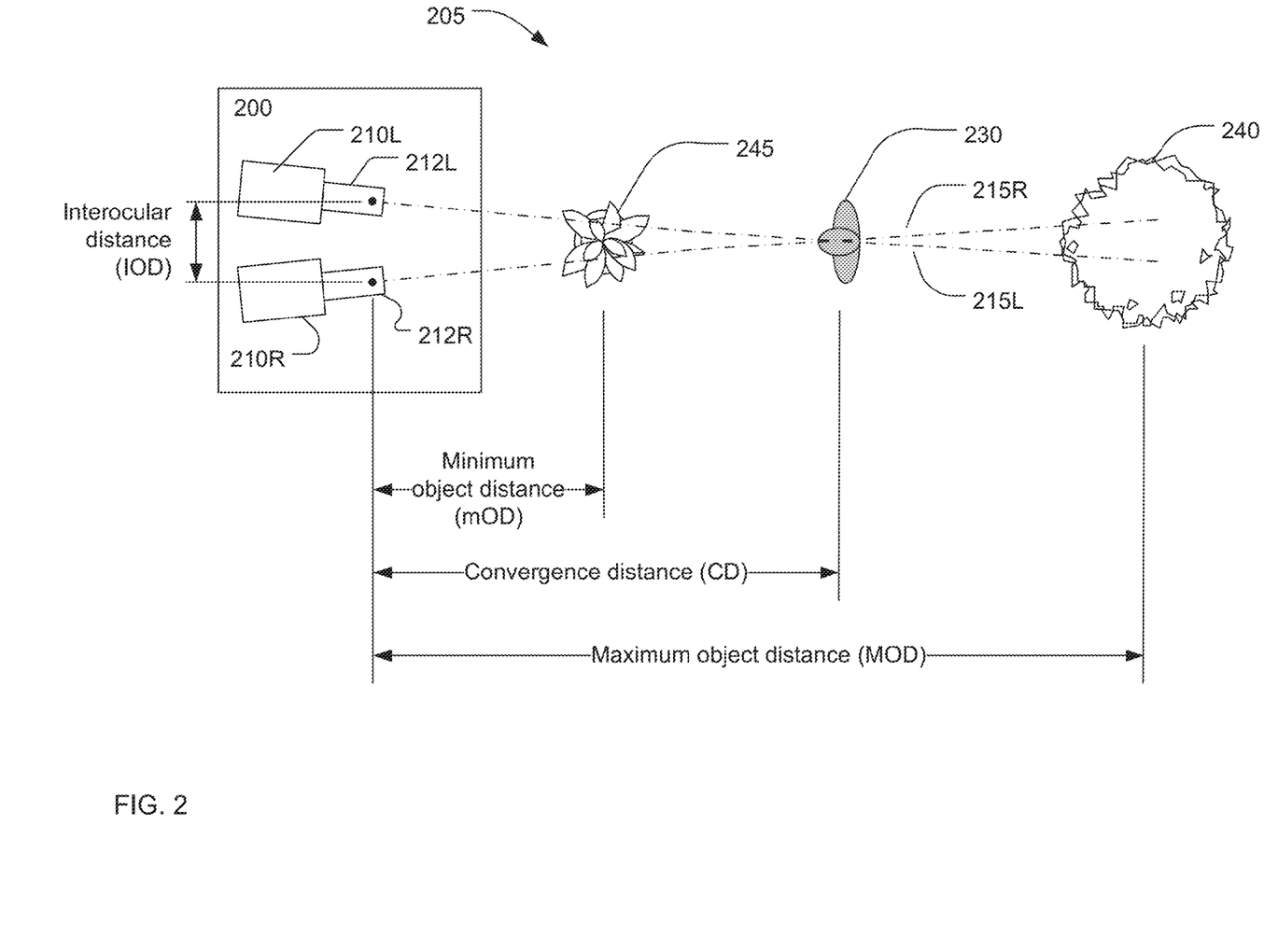
FIG. 2 is a schematic drawing of a stereographic camera in an environment including foreground objects.

Referring now to FIG. 2, a stereographic camera 200, which may be the stereographic camera 100, may include a left camera 210L and a right camera 210R, each including a respective lens 212L, 212R. The left and right cameras may be film or digital still image cameras, may be motion picture film cameras, or may be video cameras. The left and right cameras 210L, 210R may be separated by an interocular distance IOD. Each lens may have an axis 215L, 215R that defines the center of the field of view of each camera 210L, 210R. The cameras 210L, 210R may be disposed such that the axis 215L, 215R cross at a convergence distance CD from the cameras.

The stereographic camera 200 may be used to form a stereographic image of a scene 205. As shown in the simplified example of FIG. 2, the scene 205 may include a primary subject 230, which may be, for example, a person. The scene 205 may also include other features and objects in the foreground and the background. The distance from the cameras 210L, 210R to the furthest background object 240, which is shown, for example, as a tree, may be termed the maximum object distance MOD. The distance from the cameras 210L, 210R to the closest foreground object 245, which is shown, for example, as a plant, may be termed the minimum object distance mOD.

Depending on the relationship between MOD, CD, and mOD, the image of either the foreground object 245 or the background object 240 may have the greatest disparity when the scene 205 is presented on a stereographic display.

Figure 3:
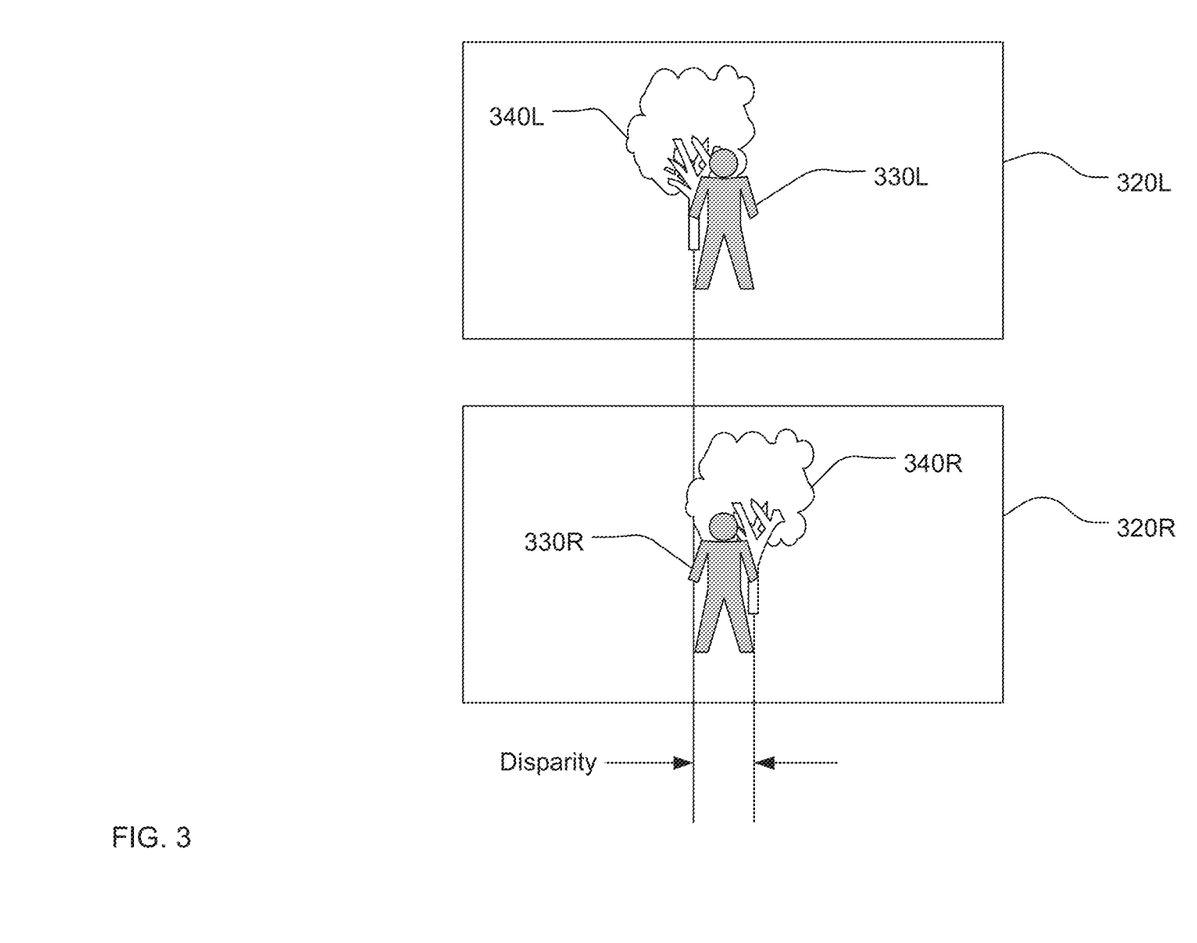
FIG. 3 is a representation of images captured by a stereographic camera.

Referring now to FIG. 3, an exemplary image captured by a left camera is illustrated as displayed on a screen 320L and an exemplary image captured by a right camera is illustrated as displayed on a second screen 320R. The image displayed on the screen 320L includes an image 330L of a primary subject near the center of the display screen, and an image 340L of an extreme background object to the left of the image 330L. The image displayed on screen 320R includes an image 330R of the primary subject near the center of the display screen, and an image 340R of the extreme background object to the right of the image 330R.

The positional difference, or disparity, between corresponding objects in the left image 320L and the right image 320R may provide an illusion of depth when the two images are viewed separately by the left and right eyes of an observer. However, to preserve the illusion of depth, the maximum disparity must be less than a limit value which may be both viewer-dependent and image-dependent. In the example of FIG. 3, the largest disparity occurs between the images 340L, 340R of the extreme background object.

Figure 4:
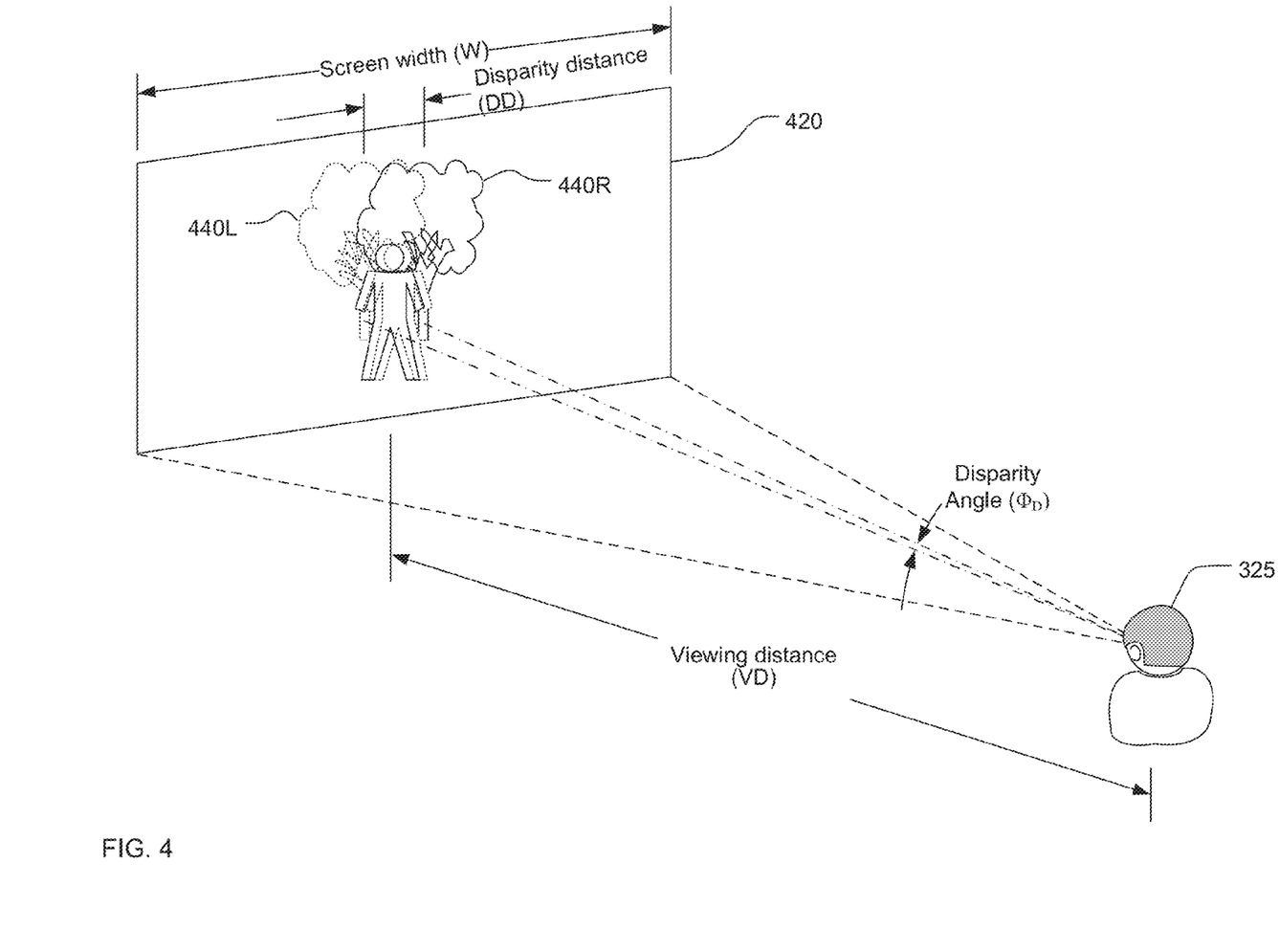
FIG. 4 is a representation of the images of FIG. 2 presented on a common viewing screen.

Referring now to FIG. 4, the left and right images captured by a stereographic camera, such as the stereographic camera 100, may be presented on a single display screen 420. The image to be seen by the right eye (shown as solid lines) and the image to be seen by the left eye (shown as dotted lines) may be separated at the viewer's 425 eyes using polarized glasses, shutter glasses, or some other method as previously described. The disparity distance DD between corresponding objects in the left and right images, such as the images of the tree 440L, 440R may be perceived by the viewer 425 as a disparity angle $\Phi_D$ between the line of sight to the object from the viewer's left and right eyes. The value of the disparity angle $\Phi_D$ perceived by the viewer 425 may be given by the formula $$\Phi_D = ATAN(DD/VD) \quad (5)$$

where DD is the disparity distance between corresponding objects in the left and right images and VD is a viewing distance from the viewer 425 to the display screen 420.

Since $\Phi_D$ must be limited to a small angle (such that TAN $\Phi_D = \Phi_D$), the maximum allowable disparity distance may be defined as $$DD\max = \Phi_{Dmax} \times VD,$$

where $\Phi_{Dmax}$ is the maximum allowable angular disparity.

Although the viewing distance VD may not be known at the time a stereographic recording is made, the viewing distance VD may be presumed to be, to at least some extent, proportional to the size of the display screen 420. For example the Society for Motion Picture and Television Engineers (SMPTE) recommends that, for optimal viewing, the width of a home theater display should subtend an angle of 30 degrees at the viewer's eyes, corresponding to a viewing distance of 1.87 times the width of the display screen. The viewing distance in homes and theaters is commonly greater than the recommended distance, and may range from 2.0 to 5.0 times the screen width.

Since the viewing distance VD may be assumed to be a multiple of the screen width W, the maximum disparity distance between the corresponding images in a stereographic display may be expressed as a fraction of the display width, as follows $$\frac{DD\max}{W} = \Phi_{Dmax} \times K \quad (6)$$

where K is the ratio of the viewing distance to the screen width. For example, assuming a viewing distance of 2.3 times the screen width, a maximum disparity angle of 15 arc minutes may be converted to a maximum disparity distance of 1% of the screen width.

Figure 5:
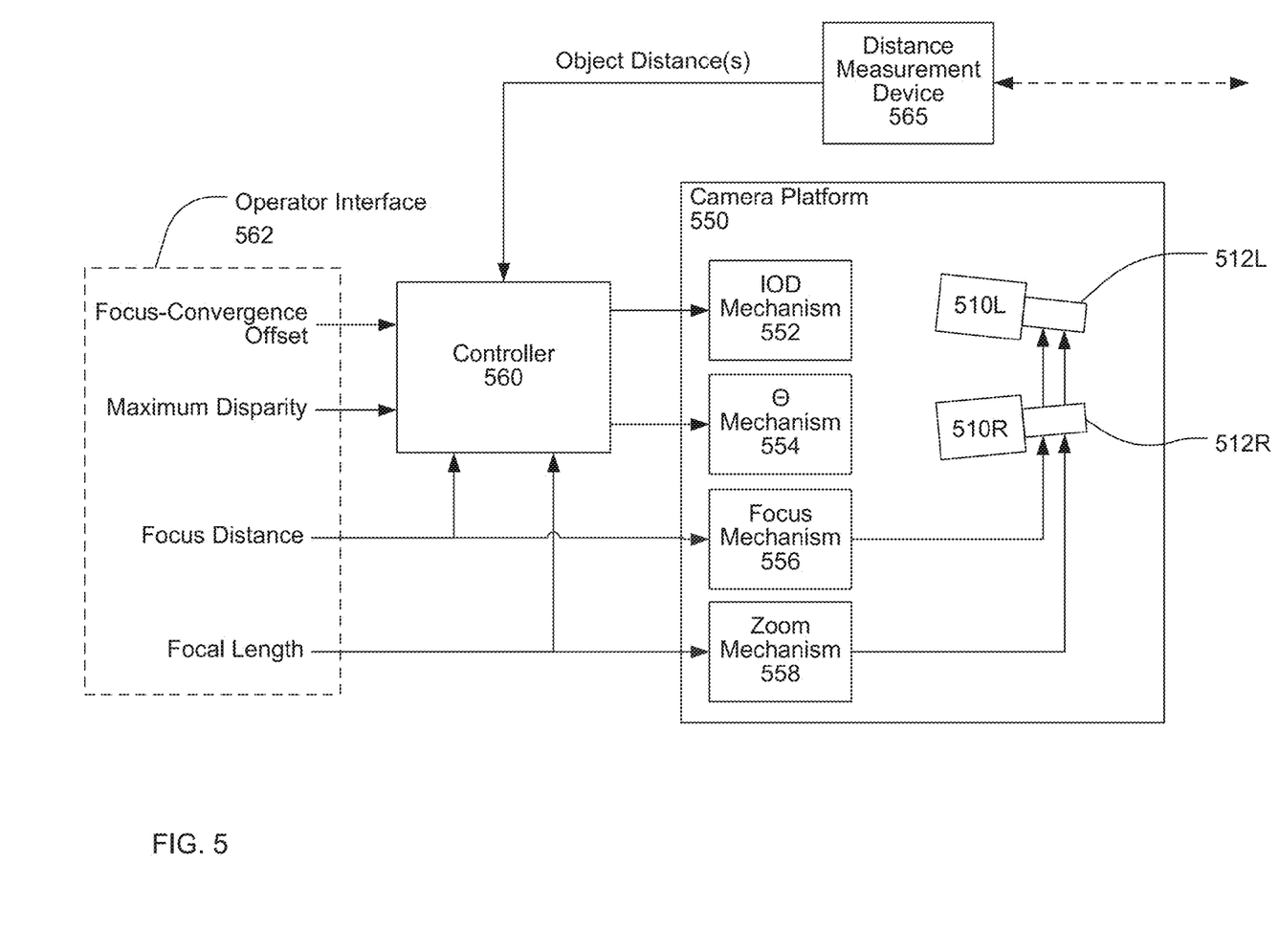
FIG. 5 is a block diagram of a stereographic camera system.

Referring now to FIG. 5, a stereographic camera system may include a camera platform 550 coupled to a controller 560. The camera platform 550 may include a left camera 510L and a right camera 510R, each of which has an associated lens 512L, 512R. The camera platform may include an IOD mechanism 552 to adjust an interocular distance between the left camera 510L and the right camera 510R. The camera platform may include a Θ mechanism 554 to adjust a convergence angle between the left camera 510L and the right camera 510R. Both the IOD mechanism 552 and the Θ mechanism 554 may include one or more movable platforms or stages coupled to motors or other actuators. The IOD mechanism 552 and the Θ mechanism 554 may be adapted to set the interocular distance and the convergence angle, respectively, in response to data received from the controller 560. Within this patent, the term "data" is intended to include digital data, commands, instructions, digital signals, analog signals, optical signals and any other data that may be used to communicate the value of a parameter such as interocular distance or convergence angle.

The camera platform 550 may include a focus mechanism 556 to synchronously adjust and set the focus distance of the lenses 512L, 512R. The focus mechanism 556 may include a mechanical, electronic, electrical, or electro-mechanical linkage between the lenses 512L, 512R to simultaneously adjust the focus distance of both lenses to the same value. The focus mechanism 556 may include a motor or other actuator adapted to set the focus distance in response to data received from the controller 560. The focus mechanism 556 may be manually controlled by an operator such as a cameraman or assistant cameraman (commonly called a "focus puller"). When manually controlled, the focus mechanism 556 may include an encoder, potentiometer, or other sensor to provide data indicating the focus distance to the controller 560. The focus mechanism 556 may be adapted to operate under manual control and/or in response to data received from the controller 560.

The camera platform 550 may include a zoom mechanism 558 to synchronously adjust and set the focal length of the lenses 512L, 512R. The zoom mechanism 558 may include a mechanical, electronic, electrical, or electro-mechanical linkage between the lenses 512L, 512R to simultaneously adjust the focal length of both lenses to the same value. The zoom mechanism 558 may include a motor or other actuator adapted to set the focal length in response to data received from the controller 560. The zoom mechanism 558 may be manually controlled by an operator such as a cameraman or assistant cameraman. When manually controlled, the zoom mechanism 558 may include an encoder, potentiometer, or other sensor to provide data indicating the focal length to the controller 560. The zoom mechanism 558 may be adapted to operate either under manual control or in response to data received from the controller 560.

The controller 560 may receive data from a distance measurement device 565. The distance measurement device may provide data indicating the distance to a nearest foreground object and/or the distance to a furthest background object.

The distance measuring device 565 may be as simple as a tape measure or other manual measuring device used by an operator who then provides the distance data to the controller using a keyboard or other data entry device (not shown). The distance measuring device 565 may be a laser range finder, an acoustic rangefinder, an optical rangefinder, or other range finding device that may interface with the controller 560 via a dedicated connection or via a network.

The distance measuring device 565 may not be a separate device, but may be the camera platform 550 operating under control of an operator and/or the controller 560. To measure distance, the convergence angle between the cameras 510L, 510R may be adjusted, automatically or under control of an operator, such that the images captured by the cameras 510L, 510R converge at a foreground object or a background object. The convergence distance to the foreground or background object may then be calculated from the interocular distance and convergence angle between the cameras 510L and 510R using the formulas given above. To provide maximum accuracy when the camera platform is used to measure distance, the interocular distance may be temporarily set to a maximum value.

The controller 560 may be coupled to an operator interface 562. The controller 560 may receive data from the operator interface 562 indicating a focus-convergence offset, as described above. The controller 560 may receive data from the operator interface 562 indicating a maximum allowable disparity. The controller 560 may also receive data from the operator interface 562 indicating the focus distance and focal length of the lenses 512L, 512R.

The operator interface 562 may be partially or wholly incorporated into the camera platform 550. The operator interface 562 may be close to the camera platform 550 or partially or wholly remote from the camera platform 550 For example, the focus mechanism 556 and/or the zoom mechanism 558 may be manually controlled by one or more operators such as a cameraman and/or an assistant cameraman. In this case, the focus mechanism 556 and/or the zoom mechanism 558 may provide data to the controller 560 indicating the manually-set focus distance and/or focal length. Similarly, control actuators to set the focus-convergence offset and/or the maximum allowable disparity may be located on the camera platform for operation by the cameraman and/or the assistant cameraman.

The operator interface 562 may be partially or wholly incorporated into the controller 560. For example, in situations where the focus-convergence offset and/or the maximum allowable disparity are fixed during the recording of a scene, the focus convergence offset and/or the maximum allowable disparity may be manually provided to the controller using a keyboard or other data entry device. In situations where one or both of the focus-convergence offset and/or the maximum allowable disparity will be varied during the recording of a scene, the focus-convergence offset and/or the maximum allowable disparity may be controlled using, for example, arrows keys on a keyboard or one or more continuous control devices such as a potentiometer, joystick or mouse.

The controller 560 may interface with the camera platform 550. The controller 560 may be integrated into the camera platform 550. The controller may provide data to and/or receive data from the focus mechanism 556 and the zoom mechanism 558 indicating the focus distance and focal length, respectively, of the lenses 512L, 512R. The controller 560 may provide data to the IOD mechanism 552 and the Θ mechanism 554 to set the interocular distance and the convergence angle, respectively, between the cameras 510L, 510R. The controller 560 may provide data to the IOD mechanism 552 and the Θ mechanism 554 based on the focus distance and focal length of the lenses 512L, 512R, the focus-convergence offset, the maximum allowable disparity, and the distance to the nearest foreground object and/or the distance to the furthest background object. The controller 560 may provide data to the IOD mechanism 552 to set the interocular distance such that the largest disparity in the recorded image does not exceed the maximum allowable disparity value.

The controller 560 may be coupled to the camera platform 550 and the operator interface 562 via a network which may be a local area network; via one or more buses such as a USB bus, a PCI bus, a PCI Express bus, or other parallel or serial data bus; or via one or more direct wired or wireless connections. The controller 560 may be coupled to the camera platform 550 and the operator interface 562 via a combination of one or more of direct connections, network connections, and bus connections.

Figure 6:
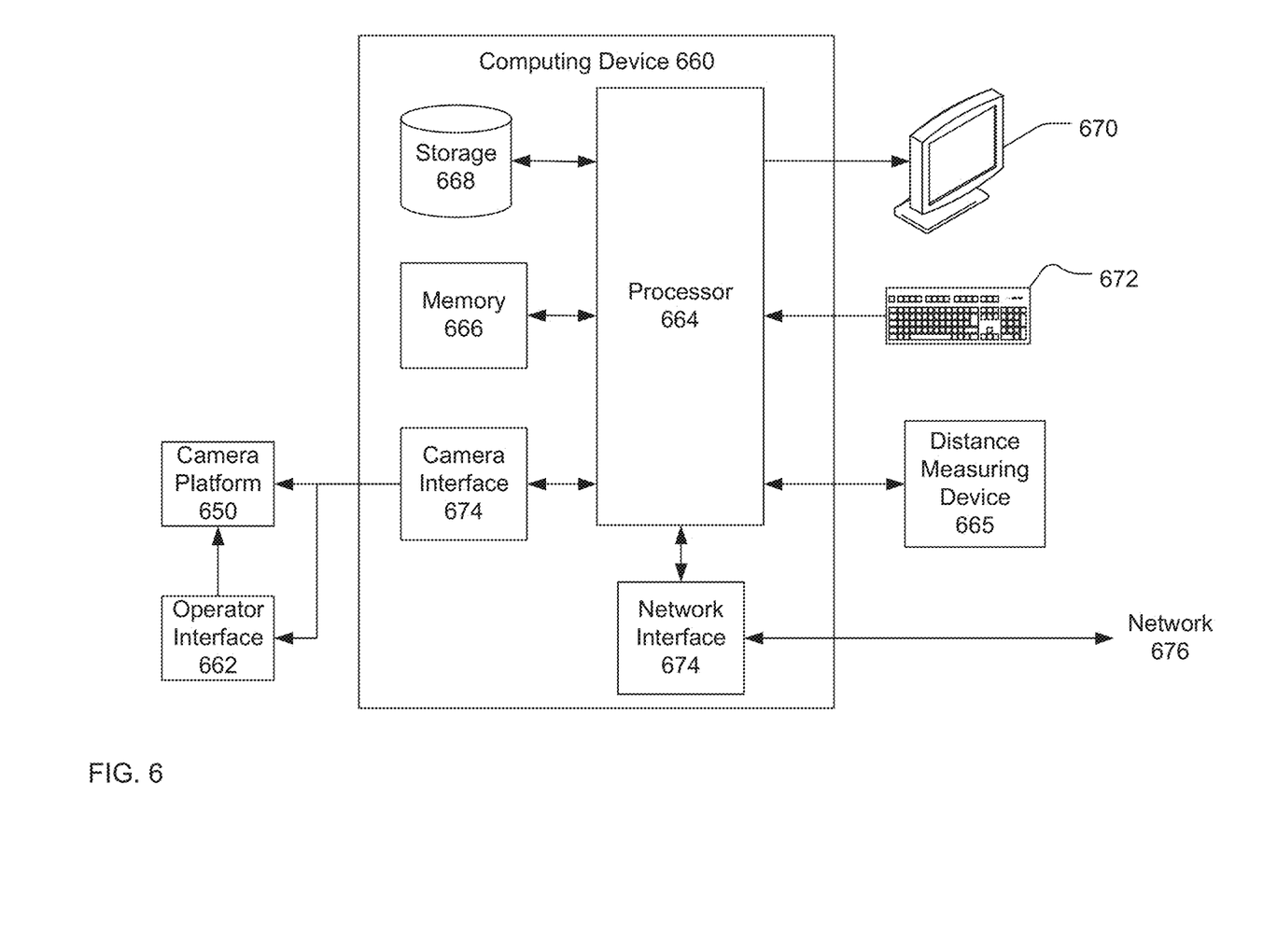
FIG. 6 is a block diagram of a computing device.

FIG. 6 is a block diagram of a computing device 660 that may be suitable for the controller 560. As used herein, a computing device refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. The computing device 660 may include hardware, firmware, and/or software adapted to perform the processes subsequently described herein. The computing device may include a processor 664 coupled to memory 666 and a storage device 668.

The storage device 668 may store instructions which, when executed by the computing device 660, cause the computing device to provide the features and functionality of the controller 560. As used herein, a storage device is a device that allows for reading from and/or writing to a storage medium. Storage devices include hard disk drives, DVD drives, flash memory devices, and others. Each storage device may accept a storage media. These storage media include, for example, magnetic media such as hard disks, floppy disks and tape; optical media such as compact disks (CD-ROM and CD-RW) and digital versatile disks (DVD and DVD±RW); flash memory cards; and other storage media. The metadata library 190 may also include a storage server (not shown) or other computing devices.

The computing device 660 may include or interface with a display device 670 and one or more input devices such a keyboard 672. The computing device 660 may also include a network interface unit 674 to interface with one or more networks 676. The network interface unit 674 may interface with the network 676 via a wired or wireless connection. The network 676 may be the Internet or any other private or public network.

The computing device 660 may receive distance data from a distance measuring device 665. The computing device 660 may be coupled to the distance measuring device 665 by a dedicated wired or wireless connection or via a network. The computing device 660 may receive distance data from the distance measuring device 665 via an operator (not shown) who may enter the distance data using an input device such as the keyboard 672.

The computing device 660 may also include a camera interface unit 678 to interface with a camera platform 650, and/or a camera operator interface 662. The camera interface unit 678 may include a combination of circuits, firmware, and software to interface with the camera platform 650, and/or the camera operator interface 662. The camera interface unit 678 may be coupled to the camera platform 650, and/or the camera operator interface 662 via a network which may be a local area network; via one or more buses such as a USB bus, a PCI bus, a PCI Express bus, or other parallel or serial data bus; or via one or more direct wired or wireless connections. The camera interface unit 678 may be coupled to the camera platform 650, and/or the camera operator interface 662 via a combination of one or more of direct connections, network connections, and bus connections.

The processes, functionality and features of the computing device 660 may be embodied in whole or in part in software which may be in the form of firmware, an application program, an applet (e.g., a Java applet), a browser plug-in, a COM object, a dynamic linked library (DLL), a script, one or more subroutines, or an operating system component or service. The computing device 660 may run one or more software programs as previously described and may run an operating system, including, for example, versions of the Linux, Unix, MS-DOS, Microsoft Windows, Palm OS, Solaris, Symbian, and Apple Mac OS X operating systems. The hardware and software and their functions may be distributed such that some functions are performed by the processor 664 and others by other devices.

Description of Processes

Figure 7:
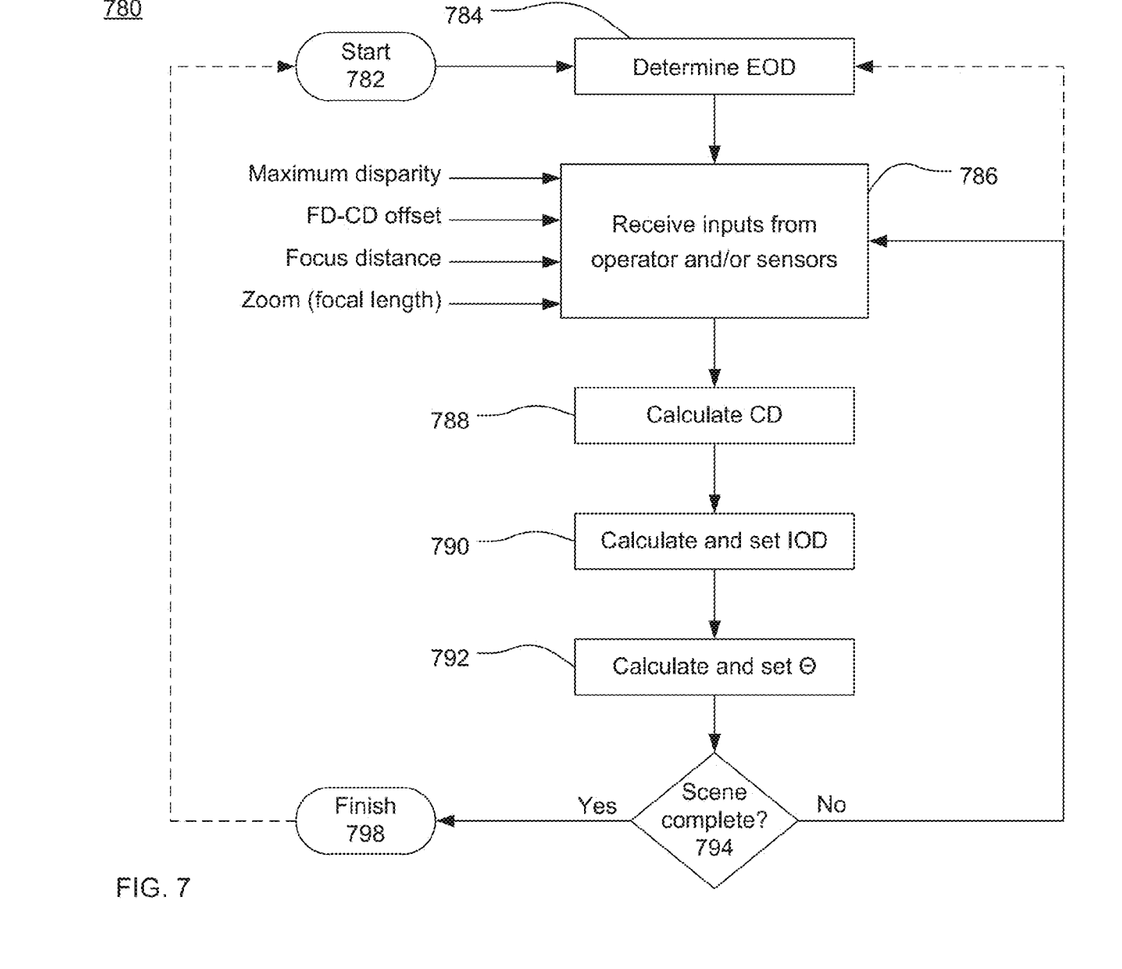
FIG. 7 is a flow chart of a process for recording stereo images.

FIG. 7 is a flow chart of an exemplary process 780 for recording stereographic images using a stereographic camera system such as the stereographic camera 500. Specifically, FIG. 7 is a flow chart of a process for recording a scene without foreground objects, such as the scene 105. The flow chart has both a start 782 and an end 798 for any single scene, but the process 780 is continuous in nature and the actions within the process may be performed continuously and in near-real time during the recording of the scene. Additionally, the process 780 may be repeated for each scene that is recorded.

Within this patent, the phrase "near-real time" means in real time except for processing delays that are very short compared with temporal events in the scene being recorded.

At 784, an extreme object distance (EOD), or the distance to an object within the scene that is the furthest from the stereographic camera, may be determined. The EOD may be determined by a tape measure or other manual measuring device used by an operator who then enters the distance data into the stereographic camera system using a keyboard or other data entry device. The EOD may be determined by a laser range finder, an acoustic rangefinder, an optical rangefinder, or other range finding device that may interface with the stereographic camera system via a dedicated connection or via a network. The EOD may be determined using the stereographic camera system itself as a range finding device, as previously described.

When recording scenes where the stereographic camera remains fixed with respect the background, the EOD may be determined once prior to the start of recording. The EOD may then be considered as a constant during the recording period in which the scene is recorded.

When recording scenes where the stereographic camera and the background move with respect to each other during the recording period, the EOD may be determined continuously and in real-time using a laser range finder, optical range finder, acoustic range finder, or other range-finding apparatus coupled to the stereographic camera.

At 786, the stereographic camera system may receive inputs indicating a maximum allowable disparity, a focal distance-convergence distance offset, a focus distance of lenses in the stereographic camera, and a focal length or zoom value of the lenses. The maximum allowable disparity, the focal distance-convergence distance offset, a focus distance, and the focal length may be set by one or more operators such as a cameraman, assistant cameraman, or director. The focal length may commonly be set by an operator such as the assistant cameraman. However, the distance to a primary scene object may be measured in real time using a laser, acoustic, optical, or other range-finding device. The focal length may be automatically set in response to the real-time measurement such that the camera lenses are focused on the primary scene object.

The inputs indicating the maximum allowable disparity, the focal distance-convergence distance offset, the focus distance and the focal length may be received in the form of manually-entered data, analog or digital signals, or data received via a network.

At 788, the convergence distance CD may be calculated based on the focus distance and the focus distance-convergence distance offset inputs. The convergence distance may be calculated using either formula (3) or formula (4) as described above.

At 790, an interocular distance IOD may be calculated and set. The IOD may be calculated based on the extreme object distance as determined at 784, the maximum allowable disparity input and focal length input received at 786, and the convergence distance calculated at 788. The IOD may be calculated using the formula $$IOD = [\text{Arctangent}(W/FL) \times EOD \times CD \times MD \times 2]/(EOD - CD) \quad (7)$$

wherein
IOD=the interocular distance
W=a width of an image sensor within each camera
FL=the focal length of the lenses
EOD=the extreme object distance
MD=the maximum disparity as a fraction of the width of the scene recorded by the stereographic camera
CD=the convergence distance.

At 792, the convergence angle Θ may be calculated and set. The convergence angle Θ may be caluclated from the convergence distance CD and the interocular distance IOC using formula (1) as described above.

The convergence distance CD, the interocular distance IOD, and the convergence angle Θ may be calculated by a controller, such as the controller 560, which may be a computing device such as the computing device 660. The IOD and the convergence angle Θ may be set by a camera platform, such as the camera platform 550, in response to data provided by the controller.

At 794, a determination may be made if the recording of the scene has been completed. If the recording is ongoing, the process 780 may repeat continuously and in near real-time from 786 if the MOD is constant during the scene. The process 780 may repeat continuously and in near real-time from 784 (as indicated by the dashed line) if the MOD varies during the scene. When the recording of a scene has been completed, the process 780 may finish at 798. Subsequently, the process 780 may start again from 782 to record the next scene.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A stereographic camera system, comprising:
   a left camera and a right camera including respective lenses having a focal length and a focus distance;
   an interocular distance mechanism to set an intraocular distance between the left and right cameras; and
   a controller configured to
      receive inputs indicating the focal length and the focus distance of the lenses, and
      control the intraocular distance mechanism, based on the focal length and focus distance of the lenses and one or both of a distance to a nearest foreground object and a distance to a furthest background object, to automatically set the interocular distance such that a maximum disparity of a stereographic image captured by the left and right cameras does not exceed a predetermined maximum disparity.

2. The stereographic camera system of claim 1, wherein the actions performed by the controller are performed continuously in near-real time.

3. The stereographic camera of claim 1, further comprising:
   a convergence mechanism to set a convergence angle between the left camera and the right camera,
   the controller further configured to control the convergence mechanism based on the focus distance and the interocular distance.

4. The stereographic camera system of claim 3, wherein the convergence angle is set such that a convergence distance is set equal to the focus distance of the lenses.

5. The stereographic camera system of claim 3, wherein the convergence angle is set such that a convergence distance CD is related to the focus distance FD of the lenses using a formula selected from CD=FD+$\alpha$, and CD=FD(1+$\beta$), wherein $\alpha$ and $\beta$ are operator-defined values.

6. A method for controlling a stereographic camera having a left camera and a right camera including respective lenses, the method comprising:
   receiving inputs indicating a focal length and a focus distance of the lenses
   controlling an intraocular distance mechanism, based on the focal length and focus distance of the lenses and one or both of a distance to a nearest foreground object and a distance to a furthest background object, to automatically set an interocular distance between the left and right cameras such that a maximum disparity of a stereographic image captured by the left and right cameras does not exceed a predetermined maximum disparity.

7. The method for controlling a stereographic camera of claim 6, wherein the method is performed continuously in near-real time.

8. The method for controlling a stereographic camera of claim 6, further comprising:
   automatically setting a convergence angle between the left camera and the right cameras based on the focus distance and the interocular distance.

9. The method for controlling a stereographic camera of claim 8, wherein the convergence angle is set such that a convergence distance is set equal to the focus distance of the lenses.

10. The method for controlling a stereographic camera of claim 8, wherein the convergence angle is set such that a convergence distance CD is related to the focus distance FD of the lenses using a formula selected from CD=FD+$\alpha$, and CD=FD(1+$\beta$), wherein $\alpha$ and $\beta$ are operator-defined values.

* * * * *